(12) United States Patent
Wu et al.

(10) Patent No.: US 10,883,917 B2
(45) Date of Patent: Jan. 5, 2021

(54) METHOD FOR IMAGING 1-D NANOMATERIALS

(71) Applicants: Tsinghua University, Beijing (CN); HON HAI PRECISION INDUSTRY CO., LTD., New Taipei (TW)

(72) Inventors: Wen-Yun Wu, Beijing (CN); Dong-Qi Li, Beijing (CN); Jin Zhang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 187 days.

(21) Appl. No.: 16/116,046

(22) Filed: Aug. 29, 2018

(65) Prior Publication Data

US 2019/0064050 A1    Feb. 28, 2019

(30) Foreign Application Priority Data

Aug. 31, 2017    (CN) .......................... 2017 1 0773546

(51) Int. Cl.
*G01N 15/14*    (2006.01)
*G01N 21/65*    (2006.01)
*G01N 21/51*    (2006.01)
*G01N 21/25*    (2006.01)
*G01N 15/00*    (2006.01)
(Continued)

(52) U.S. Cl.
CPC ......... *G01N 15/1484* (2013.01); *G01N 15/00* (2013.01); *G01N 21/255* (2013.01); *G01N 21/51* (2013.01); *G01N 21/658* (2013.01); *G02B 21/0016* (2013.01); *G02B 21/10* (2013.01);
(Continued)

(58) Field of Classification Search
None
See application file for complete search history.

(56) References Cited

U.S. PATENT DOCUMENTS

| 4,662,747 A * | 5/1987 | Isaacson | G01Q 60/22 356/317 |
| 2005/0110990 A1* | 5/2005 | Koo | G01J 3/44 356/301 |

(Continued)

FOREIGN PATENT DOCUMENTS

| CN | 105445226 A | 3/2016 |
| TW | 201608276 | 3/2016 |

OTHER PUBLICATIONS

Wang et al., Vapor-condensation-assisted optical microscopy for ultralong carbon nanotubes and other nanostructures, Nano Letter, May 22, 2014, vol. 14, p. 3527-p. 3533.
(Continued)

*Primary Examiner* — Kara E. Geisel
*Assistant Examiner* — Jarreas C Underwood
(74) *Attorney, Agent, or Firm* — ScienBiziP, P.C.

(57) ABSTRACT

A method for imaging 1-D nanomaterials is provided. The method includes: providing a 1-D nanomaterials sample; immersing the 1-D nanomaterials sample in a liquid; illuminating the 1-D nanomaterials sample by a first incident light and a second incident light to cause resonance Rayleigh scattering, wherein the first incident light and the second incident light are not parallel to each other; and acquiring a resonance Rayleigh scattering image of the 1-D nanomaterials sample with a microscope.

14 Claims, 10 Drawing Sheets

(51) Int. Cl.
*G02B 21/36* (2006.01)
*G02B 21/10* (2006.01)
*G02B 21/00* (2006.01)

(52) U.S. Cl.
CPC ... *G02B 21/361* (2013.01); *G01N 2015/0038* (2013.01); *G01N 2015/1497* (2013.01)

(56) References Cited

U.S. PATENT DOCUMENTS

| | | | | |
|---|---|---|---|---|
| 2010/0285656 | A1* | 11/2010 | Esconjauregui | H01J 9/025 |
| | | | | 438/478 |
| 2011/0207207 | A1* | 8/2011 | Gibson | G01N 33/56966 |
| | | | | 435/288.3 |
| 2013/0107358 | A1* | 5/2013 | Knebel | G02B 21/084 |
| | | | | 359/385 |
| 2016/0061664 | A1* | 3/2016 | Wu | G01N 21/65 |
| | | | | 356/301 |
| 2016/0061733 | A1* | 3/2016 | Wu | G01N 21/21 |
| | | | | 356/301 |
| 2016/0061734 | A1* | 3/2016 | Wu | G02B 21/33 |
| | | | | 356/301 |
| 2019/0064073 | A1* | 2/2019 | Wu | G01N 21/6458 |

OTHER PUBLICATIONS

Yu et al., Rayleigh and Raman scattering from individual carbon nanotube bundles, The Journal of Physical Chemistry B, 2001, Jan. 19, 2001, vol. 105, p. 1123-p. 1134.

* cited by examiner

METHOD FOR IMAGING 1-D NANOMATERIALS

CROSS-REFERENCE TO RELATED APPLICATIONS

This application claims all benefits accruing under 35 U.S.C. § 119 from China Patent Application No. 201710773546.4, filed on Aug. 31, 2017, in the China Intellectual Property Office, the contents of which are hereby incorporated by reference. The application is also related to co-pending application Ser. No. 16/116,063 entitled, "DEVICE FOR IMAGING 1-D NANOMATERIALS", concurrently filed.

FIELD

The present disclosure relates to a method for imaging one-dimensional (1-D) nanomaterials, and more particularly to a method for assigning chirality of 1-D nanomaterials by spectral measurement method.

BACKGROUND

1-D nanomaterial, such as carbon nanotubes, obtained by conventional methods is usually a mixture nanotubes with different chiralities and different lengths. Carbon nanotubes with different chiralities have different properties, such as thermal, electrical, optical and mechanical properties. However, determining the chiralities of carbon nanotubes can be difficult.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
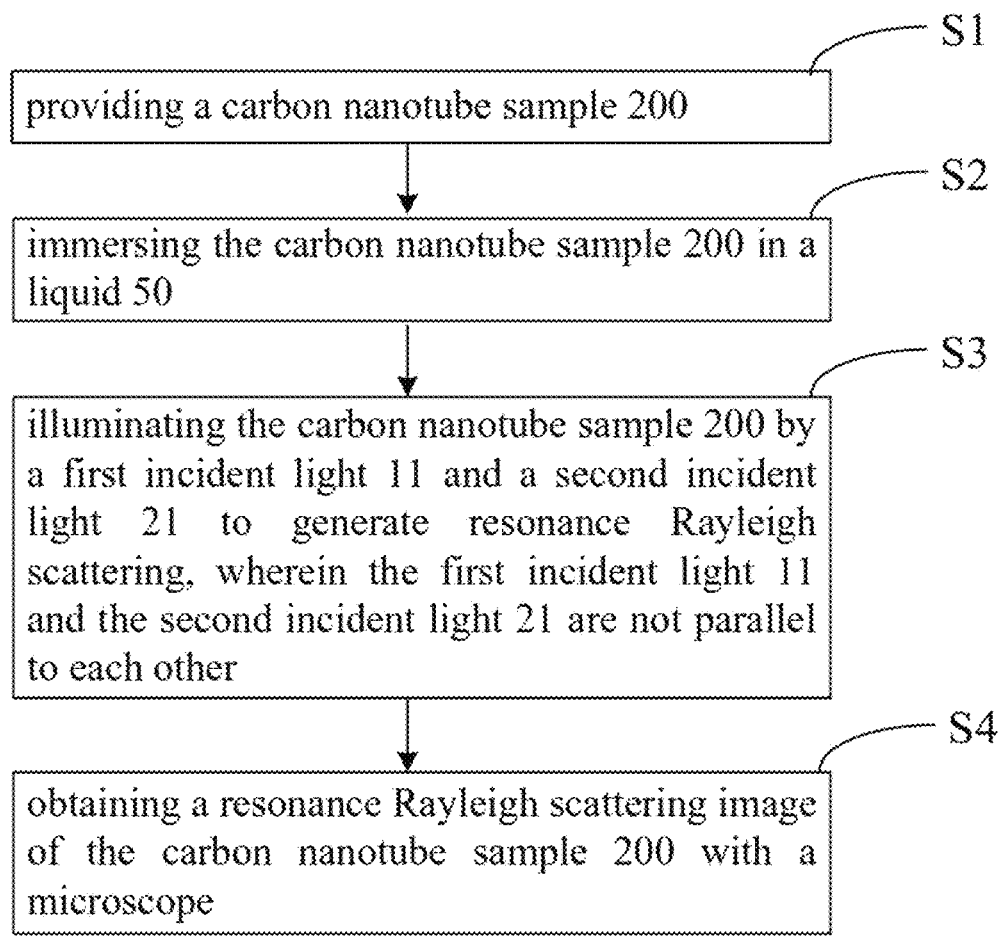
FIG. 1 is a flow diagram of one embodiment of a method for imaging 1-D nanomaterial.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to be better illustrate details and features. The description is not to be considered as limiting the scope of the embodiments described herein.

Several definitions that apply throughout this disclosure will now be presented.

The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The 1-D nanomaterial, such as nanotubes, nanorods, nanowires, nanofibers, and nanobelts, is a material with a diameter ranging from 1 nm to 100 nm and a length-to-diameter ratio ranging from 101 to 105. The most common 1-D nanomaterial includes carbon nanotubes, graphene strips, metal nanowires, carbon fibers, and the like. While the specification describes a method for imaging carbon nanotubes to determining the chiralities of the carbon nanotubes, the method is also applicable to other 1-D nanomaterial.

Figure 2:
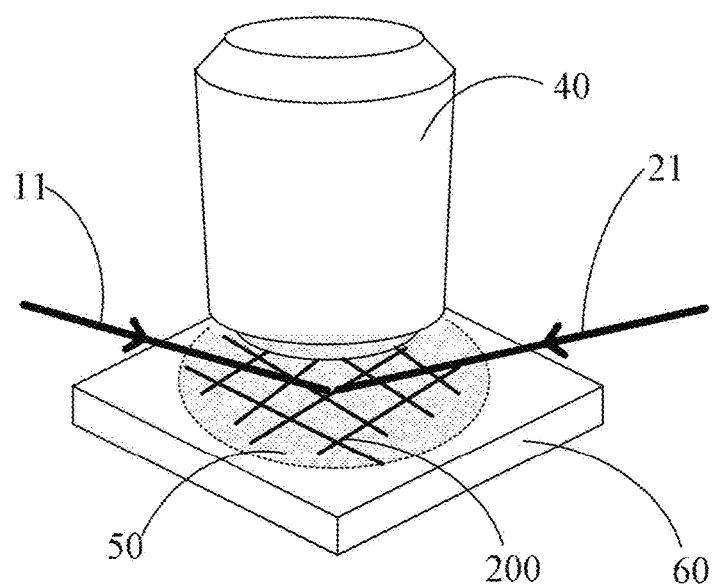
FIG. 2 is a schematic view of one embodiment of a method for imaging 1-D nanomaterial.

FIG. 1 and FIG. 2, show an embodiment of a method for imaging carbon nanotubes. The method comprises, at least the following steps:

S1, providing a carbon nanotube sample 200;

S2, immersing the carbon nanotube sample 200 in a liquid 50;

S3, illuminating the carbon nanotube sample 200 by a first incident light 11 and a second incident light 21, not parallel to the first incident light, to cause resonance Rayleigh scattering; and S4, acquiring a resonance Rayleigh scattering (RRS) image of the carbon nanotube sample 200 with a microscope;

S5, measuring resonance Rayleigh scattering spectra of the carbon nanotube sample 200 to determine a chirality of the carbon nanotube sample 200.

In step S1, the carbon nanotube sample 200 can be single-walled carbon nanotubes or multi-walled carbon nanotubes. The structure and direction of the carbon nanotube sample 200 are not limited. In one embodiment, all the carbon nanotubes of the carbon nanotube sample 200 are horizontally aligned on a substrate 60. The carbon nanotubes can be straight or curved. There is no requirement that the carbon nanotubes are parallel with each other. Therefore, the carbon nanotubes may not be parallel with each other.

Simply, the carbon nanotube sample 200 can include carbon nanotubes aligned in different directions.

In step S2, the carbon nanotube sample 200 is completely immersed in the liquid 50. The type of the liquid 50 can be determined by the type of the optical microscope objective. Microscope objectives can be divided into two categories: water lens and oil lens. If the microscope objective is a water lens, the liquid 50 can be water, ultrapure water or aqueous solution. If the microscope objective is an oil lens, the liquid 50 can be glycerin, cedar oil, or paraffin oil. Furthermore, the liquid 50 should be pure without any bubbles in the liquid 50 that may reduce image resolution.

In one embodiment, the carbon nanotube sample 200 and the substrate 60 are completely immersed in the liquid 50. The refractive index of the substrate 60 is close to the refractive index of the liquid 50 to reduce the scattering at the interface of the liquid 50 and the substrate 60. Furthermore, an "interface dipole enhancement effect" at the interface between the carbon nanotube sample 200/liquid 50 mixture will enhance the resonance Rayleigh scattering of the carbon nanotube sample 200.

In step S3, both the first incident light 11 and the second incident light 21 have a continuous spectrum. In one embodiment, the first incident light 11 and the second incident light 21 are white light with a continuous spectrum. A supercontinuum white laser (Fianium SC400) can be used to provide continuous white light.

The angle between the first incident light 11 and the second incident light 21 is θ, and 0°<θ<180°. In one embodiment, the first incident light 11 and the second incident light 21 are perpendicular to each other.

The angle between the first incident light 11 and the substrate 60 is a1, and 45°<a1<90°. The angle between the second incident light 21 and the substrate 60 is a2, and 45°<a2<90°. In one embodiment, a1=a2.

In one embodiment, the first incident light 11 and the second incident light 21 can be filtered before reaching the carbon nanotube sample 200. For example, an optical filter can be positioned in the optical paths of the incident light. The optical filter can filter out infrared light in the incident light to avoid a heating effect that may raise the temperature of the carbon nanotube sample 200.

In one embodiment, the first incident light 11 and the second incident light 21 can be focused before reaching the carbon nanotube sample 200. For example, a focusing lens can be positioned in the optical paths of the incident light to increase light intensity.

Resonance Rayleigh scattering occurs when the carbon nanotube sample 200 is illuminated by the incident light. The first incident light 11 and the second incident light 21 can be coupled to the surface of the carbon nanotube by at least one or more of the following three methods.

Method One

The carbon nanotube sample 200 and the liquid 50 are contained in a liquid container. The liquid container includes a side surface and a bottom surface. The side surface and the bottom surface together define a chamber for containing the carbon nanotube sample 200 and the liquid 50. The carbon nanotubes sample 200 is immersed in the liquid 50 and located substantially adjacent to or resting on the bottom surface of the container. The side surface includes at least one transparent portion for allowing incident light to pass through and enter the liquid 50. The first incident light 11 and the second incident light 21 illuminate the carbon nanotube sample 200 using the at least one transparent portion. In one embodiment, the transparent portion is made of quartz.

The intersection of the incident light and the transparent portion is below the liquid surface. In one embodiment, both the first incident light 11 and the second incident light 21 are perpendicular to the transparent portion, which can reduce any dispersion and attenuation of either of the incident lights.

Method Two

The first incident light 11 and the second incident light 21 illuminate the carbon nanotube sample 200 through optical fibers. The optical fiber includes a first end and a second end opposite to the first end. The first end is coupled to the incident light sources and the second end is immersed in the liquid 50.

Method Three

The first incident light 11 and the second incident light 21 illuminate the carbon nanotube sample 200 using a prism. The prism includes a first prism surface, a second prism surface, and a third prism surface. The carbon nanotubes sample 200 is located on the third prism surface and immersed in the liquid 50. The first incident light 11 illuminates the carbon nanotube sample 200 using the first prism surface, and the second incident light 21 illuminates the carbon nanotube sample 200 using the second prism surface.

In one embodiment, the first incident light 11 is perpendicular to the first prism surface and the second incident light 21 is perpendicular to the second prism surface.

The above three methods can be implemented individually or in combination. For example, the first incident light 11 can illuminate the carbon nanotube sample 200 through the first method, and the second incident light 21 can illuminate the carbon nanotube sample 200 using the second method; or the first incident light 11 can illuminate the carbon nanotube sample 200 through the first method, and the second incident light 21 can illuminate the carbon nanotube sample 200 through the third method; or the first incident light 11 can illuminate the carbon nanotube sample 200 through the second method, and the second incident light 21 can illuminate the carbon nanotube sample 200 through the third method.

Resonance Rayleigh scattering is caused when the carbon nanotube sample 200 is illuminated by the first incident light 11 and the second incident light 21. The color of the carbon nanotube sample 200 is associated with the chirality of the carbon nanotube sample 200. Different colors correspond to different chiralities. Therefore, a resonance Rayleigh scattering image of the illuminated carbon nanotube sample 200 can be used to determine chiralities of the carbon nanotube sample 200.

In step S4, the optical microscope is used to view the carbon nanotube sample 200. A color, position and shape of the carbon nanotube sample 200 can be obtained in real time using the optical microscope. The color information can be used to determine the chirality of the carbon nanotube sample 200. The position information can be used to locate the carbon nanotube sample 200.

Figure 3:
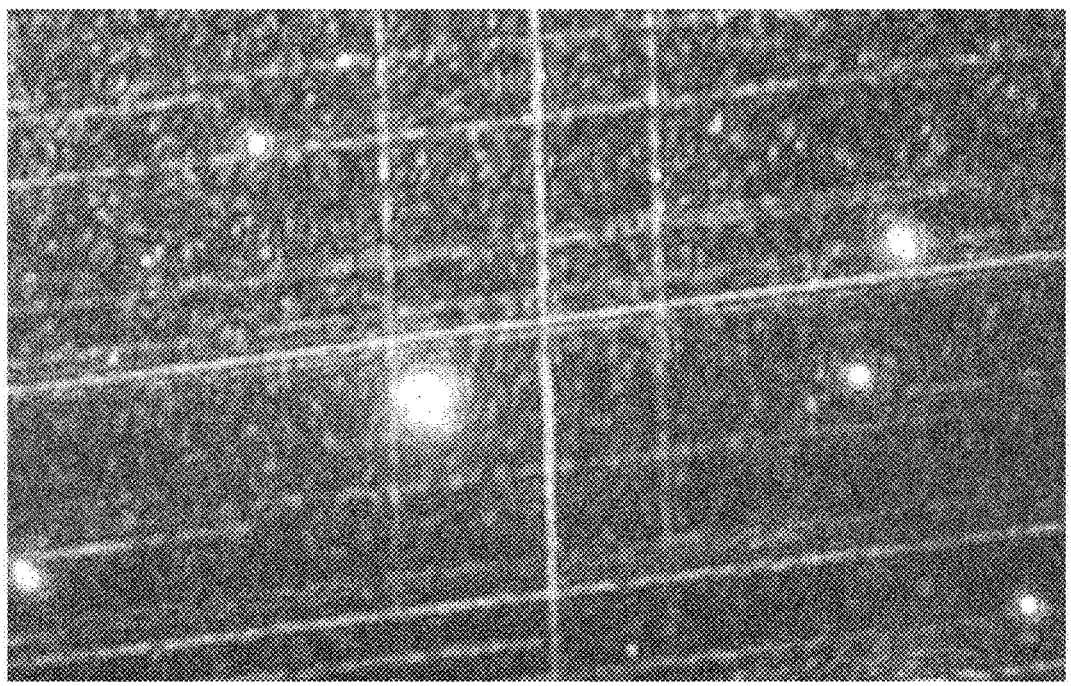
FIG. 3 is a resonance Rayleigh scattering (RRS) image of single-walled carbon nanotubes according to one embodiment.

FIG. 3 is a resonance Rayleigh scattering image of single-walled carbon nanotubes immersed in ultrapure water according to one embodiment. The microscope objective 40 is a water immersion objective with a magnification of 63X and numerical aperture of 0.9. The microscope 40 is immersed in the liquid 50. In FIG. 3, the color of the single-walled carbon nanotubes corresponds to the chiralities of the single-walled carbon nanotubes.

FIG. 3 also comprises position and shape information of the carbon nanotube sample 200. The position information can be used to locate the carbon nanotube sample 200.

In step S5, the resonance Rayleigh scattering light of the carbon nanotube sample 200 can be transmitted to a spectrometer, which can calculate and provide spectral information of the carbon nanotube sample 200. The spectral information may be Rayleigh scattering spectra, Raman scattering spectra, or fluorescence spectral information.

Figure 4:
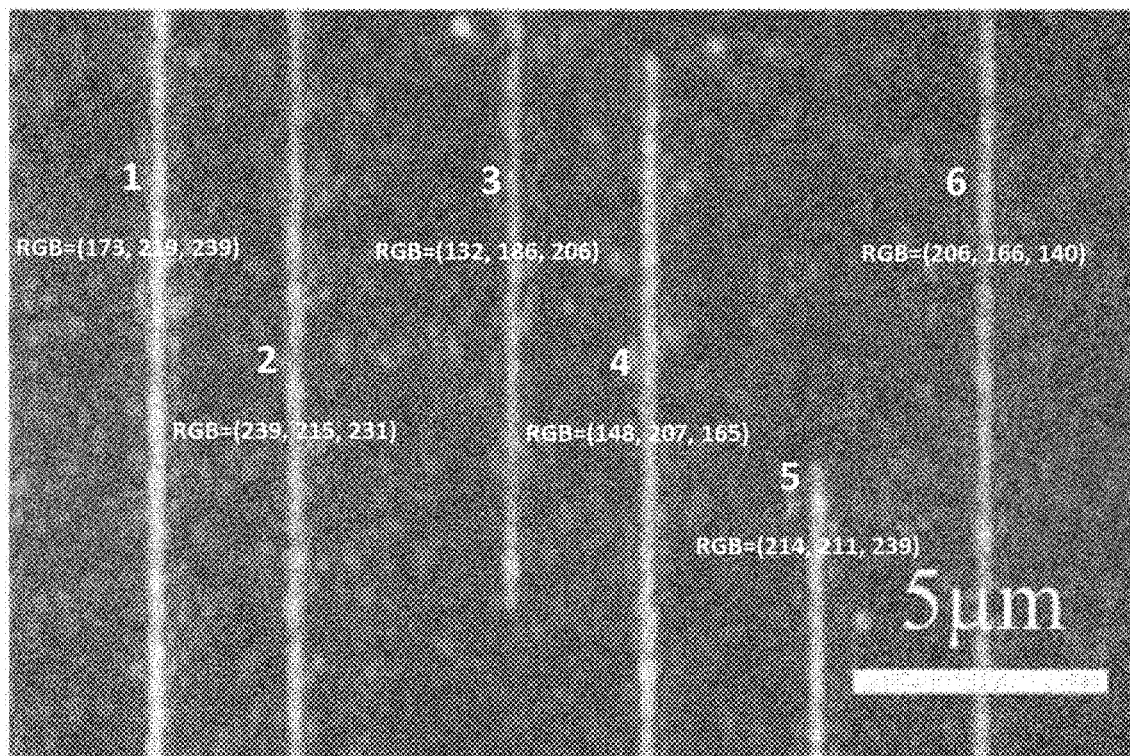
FIG. 4 is another RRS image of single-walled carbon nanotubes according to one embodiment.
Figure 5:
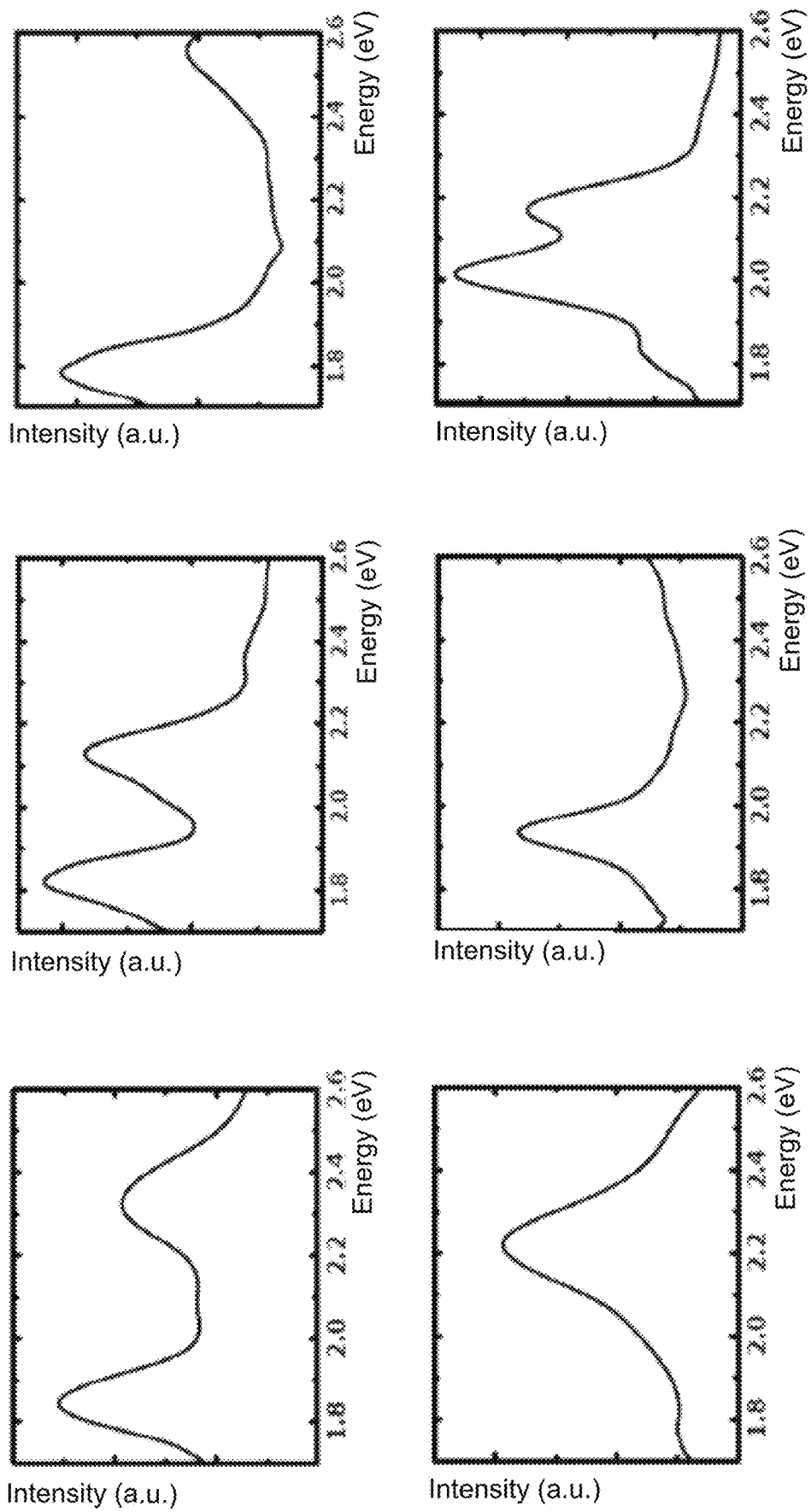
FIG. 5 is RRS spectra of the single-walled carbon nanotubes in FIG. 4.
Figure 6:
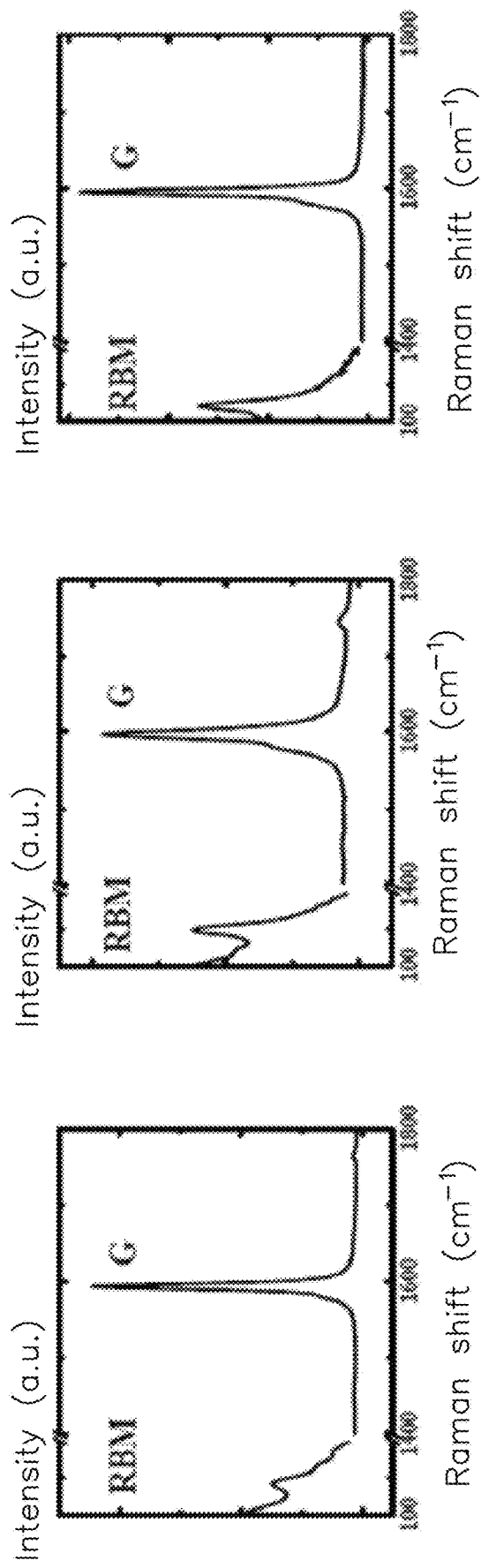
FIG. 6 is Raman spectra of the single-walled carbon nanotubes in FIG. 4.

Referring to FIG. 4, FIG. 5, and FIG. 6:

FIG. 4 is a resonance Rayleigh scattering image of six, single-walled carbon nanotubes according to one embodiment.

FIG. 5 is the resonance Rayleigh scattering spectra of the six, single-walled carbon nanotubes of FIG. 4.

FIG. 6 is Raman spectra of the third, the fourth and the fifth single-walled carbon nanotubes of the six, single-walled carbon nanotubes of FIG. 4.

The first, the second, and the sixth single-walled carbon nanotubes all have two resonant peaks in the visible region and the chiral indices can be easily assigned. The other three single-walled carbon nanotubes of the six, single-walled carbon nanotubes have a single resonant peak in the visible region. Therefore, additional diameter information provided by radial breathing mode (RBM) in Raman spectra is needed, which can greatly speed up the chirality assignment of the other three single-walled carbon nanotubes. The Raman spectrum of the carbon nanotube sample 200 can be excited by a light source other than the first and second ones.

In one embodiment, the Raman spectra of the carbon nanotube sample 200 is obtained by at least one or more steps of:

S51, measuring resonance Rayleigh scattering spectra of the carbon nanotube sample 200;

S52, selecting an/the excitation wavelength needed to produce Raman scattering; and S53, acquiring the Raman scattering of the illuminated carbon nanotube sample 200.

Using conventional methods, it is time consuming to select the excitation wavelength of Raman scattering. However, by using the methods described herein, such as using Rayleigh spectra resonance information, the Raman scattering excitation wavelength is easily selected. For example, the third and the fifth single-walled carbon nanotubes could be excited by a 633 nm laser beam, and the fourth single-walled carbon nanotube could be excited by a 514 nm laser beam.

FIG. 6 is Raman spectra of the third, the fourth and the fifth single-walled carbon nanotubes of FIG. 4. Combining Rayleigh spectra and Raman spectra, the chiral indices of the six, individual single-walled carbon nanotubes of FIG. 4 are determined to be: (35, 10), (17, 12), (22, 3), (13, 9), (19, 14), and (26, 21).

Figure 7:
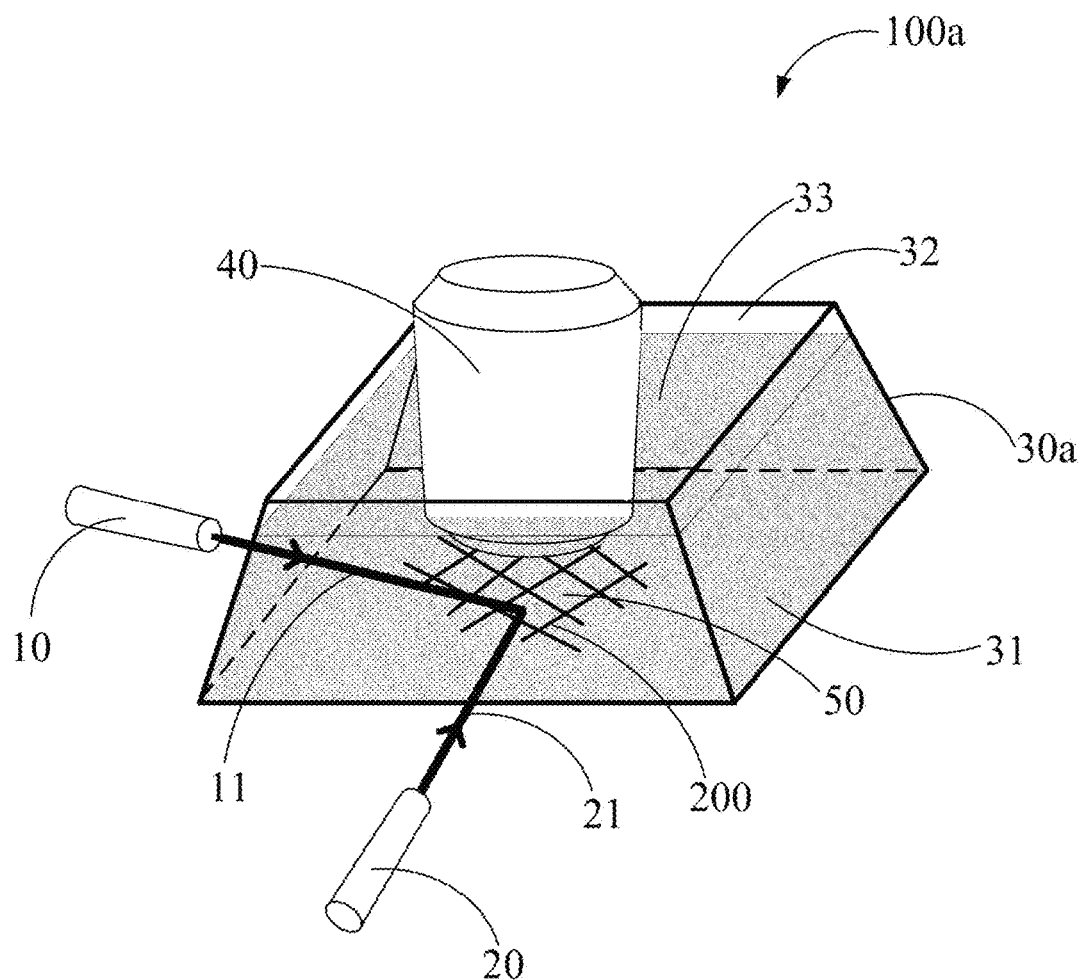
FIG. 7 is a schematic view of one embodiment of a device for imaging 1-D nanomaterial.

FIG. 7 shows a device 100a for imaging carbon nanotubes according to one embodiment. The device 100a includes: a first light source 10, a second light source 20, a container 30a, and a microscope (object 40).

The first light source 10 provides the first incident light 11 and the second light source 20 provides the second incident light 21. In one embodiment, both the first light source 10 and the second light source 20 are separate supercontinuum white lasers. The angle between the first incident light 11 and the second incident light 21 is greater than 0°. In one embodiment, the angle between the first incident light 11 and the second incident light 21 is 90°.

The container 30a is used to contain the carbon nanotube sample 200 and the liquid 50. The container 30a includes a side surface 31 and a bottom surface 32. The side surface 31 and the bottom surface 32 together define a chamber for containing the carbon nanotube sample 200 and the liquid 50. The carbon nanotubes sample 200 is located substantially adjacent to or resting on the bottom surface 32 and completely immersed in the liquid 50. The side surface 31 includes at least one transparent portion. The first incident light 11 and the second incident light 21 illuminate the carbon nanotube sample 200 using the at least one transparent portion. The transparent portion should ensure that the first incident light 11 and the second incident light 21 pass through it with as little loss as possible. The material of the transparent portion is a transparent material, such as glass, quartz, or plastic. The transparent portion is a layered structure with a uniform thickness. An angle between the at least one transparent portion and the bottom surface 31 should range from about 45° to about 90°. In one embodiment, the angle is 75°.

The microscope is used to view the illuminated carbon nanotube sample 200. The microscope objective 40 can have a water immersion objective or an oil immersion objective. The microscope objective 40 is immersed in the liquid 50 during observation. In one embodiment, the microscope objective 40 is a water immersion objective with a magnification of 63×, and a numerical aperture of 0.9.

Figure 8:
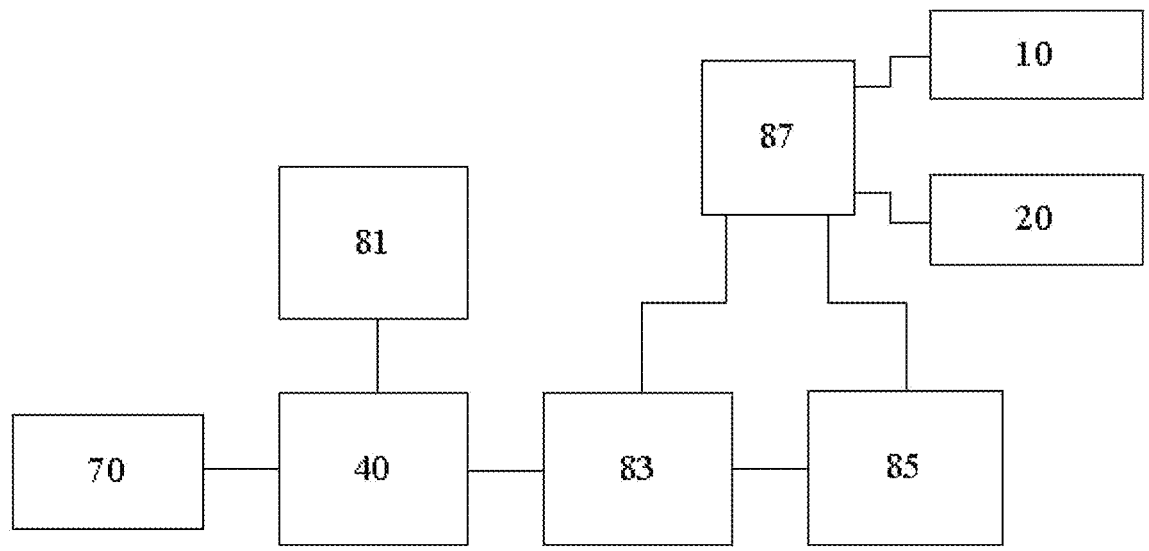
FIG. 8 is a block diagram of one embodiment of a device for imaging 1-D nanomaterial.

FIG. 8 shows the device 100a can further include a spectrometer 70 connected to the microscope. The spectrometer 70 collects spectral information of the carbon nanotubes sample 200.

FIG. 8 also shows the device 100a can further include a vapor-assisted unit 81, an image capturing unit 83, an image processing unit 85, and a control module 87.

The vapor-assisted unit 81 blows vapor to the carbon nanotube sample 200. When the vapor reaches the carbon nanotube sample 200, the vapor condenses into micro-droplets on the condensation nuclei attached to the carbon nanotube sample 200. Under oblique illumination, the micro-droplets of water act as scattering centers, appearing as bright dots under a dark-field optical microscope. Thus, the carbon nanotube sample 200 is easily viewed by optical microscopy.

The image capturing unit 83 is connected to the optical microscope 40. The image capturing unit 83 is used to record an image viewed through the optical microscope 40. The image viewed can be an image of resonance Rayleigh scattering or a contour image of the carbon nanotube sample 200 obtained by using the vapor-assisted unit 81.

The image processing unit 85 is used to receive the image obtained by the image capturing unit 83, and to analyze the image to obtain the extension direction of the carbon nanotube sample 200.

The control unit 87 is connected to the first light source 10 and the second light source 20. The control unit 87 is used to adjust the intensity and angle of one or both of the first incident light 11 and the second incident light 21.

The control unit 87 can also be connected to the image capturing unit 83 for controlling how the image capturing unit 83 collects images of the carbon nanotube sample 200.

The control unit 87 can also be connected to the image processing unit 85 and used to receive the extension direction information of the carbon nanotube sample 200 obtained by the image processing unit 85, and select one or two light sources and their respective directions, according to the extension direction information.

When the carbon nanotube sample 200 extends only in one direction, the control unit 87 chooses either the first light source 10 or the second light source 20 to illuminate the sample 200; when the carbon nanotube sample 200 extend in two or more directions, the control unit 87 chooses the first light source 10 and the second light source 20 to operate simultaneously to illuminate the sample 200.

The method of choosing a light source comprises at least one or more of the steps of:

S101, applying vapor to the carbon nanotube sample 200;

S101', obtaining an image of the carbon nanotube sample 200 using optical microscopy;

S102, acquiring an extension direction information of the carbon nanotube sample 200 according to the image;

S103a, when the carbon nanotube sample 200 extends in only one direction, choosing one light source to view the carbon nanotube sample 200;

S103b, when the carbon nanotube sample 200 extends in two or more directions, using two light sources to view the carbon nanotube sample 200.

Figure 9:
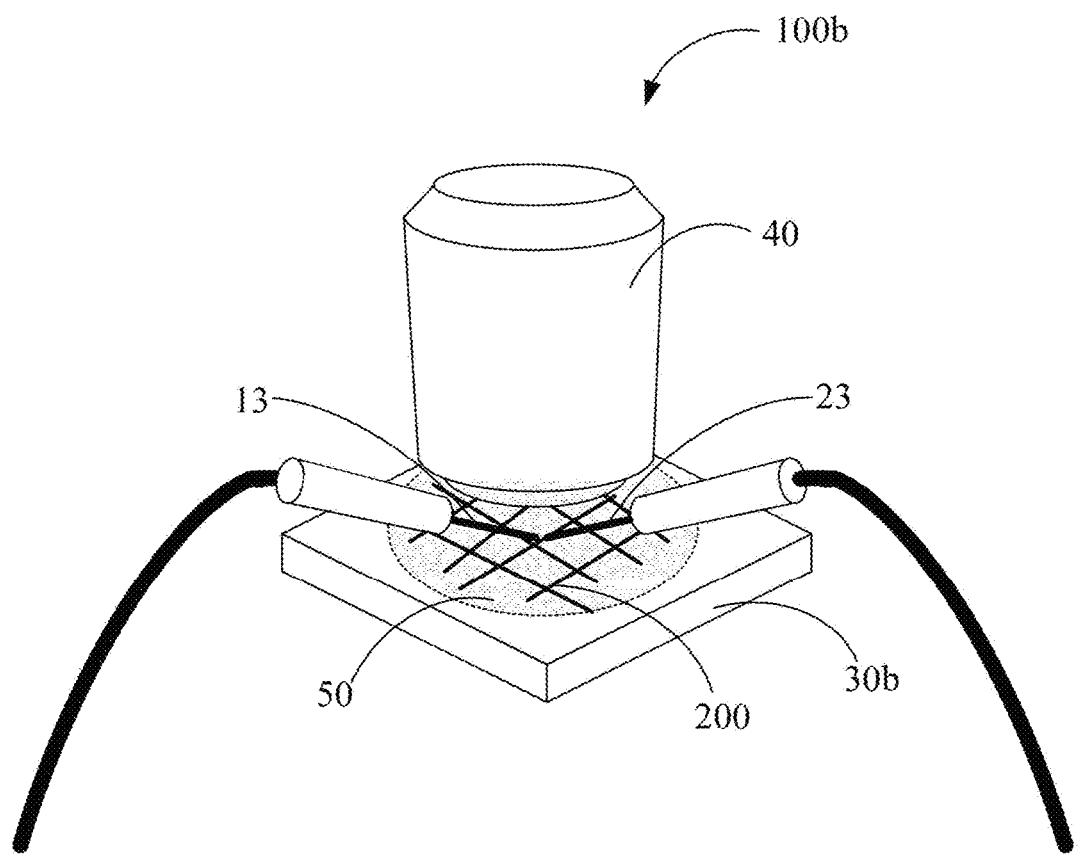
FIG. 9 is a schematic view of another embodiment of a device for imaging 1-D nanomaterial.

FIG. 9 shows a device 100b for imaging carbon nanotubes according to one embodiment. The device 100b includes: a first light source 10, a second light source 20 (now shown), a container 30b, and a microscope (objective 40).

The first light source 10 provides the first incident light 11 and the second light source 20 provides the second incident light 21. Both the first light source 10 and the second light source 20 are separate supercontinuum white lasers.

A difference between the device 100a and the device 100b is that the device 100b includes a first optical fiber 13 and a second optical fiber 23. Both the first optical fiber 13 and the second optical fiber 23 have two ends. One end of the first optical fiber 13 is connected to the first light source 10 and the other end is immersed in the liquid 50. One end of the second optical fiber 23 is connected to the second light source 20 and the other end is immersed in the liquid 50.

The container 30b is used to contain the carbon nanotube sample 200 and the liquid 50.

Another difference between the device 100a and the device 100b is that the container 30b of the device 100b can also be a layered structure, such as a substrate.

Figure 10:
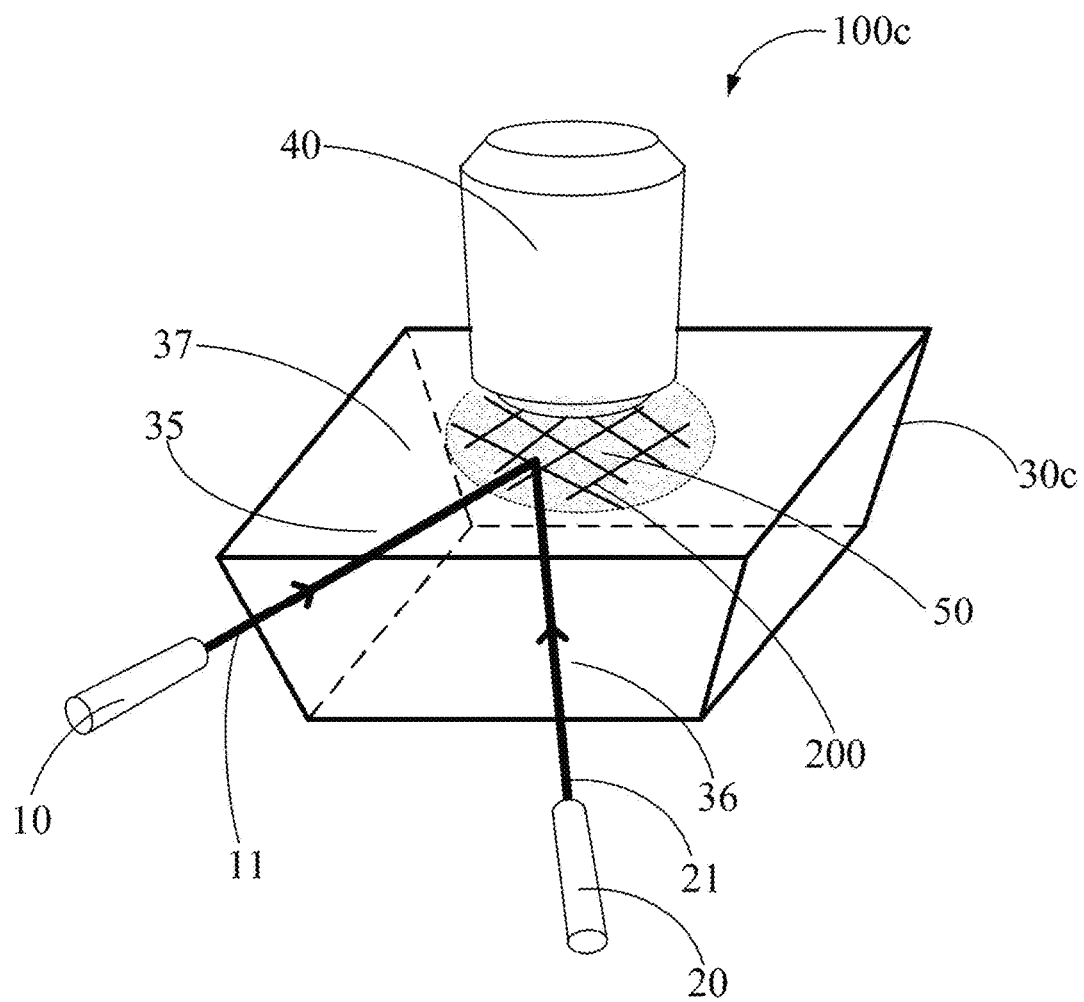
FIG. 10 is a schematic view of another embodiment of a device for imaging 1-D nanomaterial.

FIG. 10 shows a device 100c for imaging carbon nanotubes according to one embodiment. The device 100c includes: a first light source 10, a second light source 20, a container 30c, and a microscope (objective 40).

Another difference between the device 100a and the device 100c is that a portion of the container 30c of the device 100c is prismatic, the first incident light 11 and the second incident light 21 illuminate the carbon nanotube sample 200 using the prismatic portion. The prismatic portion includes a first prism surface 35, a second prism surface 36, and a third prism surface 37. The carbon nanotubes sample 200 is located on the third prism surface 37 and immersed in the liquid 50. The first incident light 11 illuminates the carbon nanotube sample 200 using the first prism surface 35, and the second incident light 21 illuminates the carbon nanotube sample 200 using the second prism surface 36. The angle between the first prism surface 35 and the third prism surface 37 is about 45° to about 90°; and the angle between the second prism surface 36 and the third prism surface 37 is about 45° to about 90°.

In one embodiment, the first incident light 11 is perpendicular to the first prism surface 35; and the second incident light 21 is perpendicular to the second prism surface 36.

The embodiments shown and described above are only examples. Even though numerous characteristics and advantages of the present technology have been set forth in the forego description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for imaging one-dimensional (1-D) nanomaterials, comprising:
    providing a 1-D nanomaterials sample;
    immersing the 1-D nanomaterials sample in a liquid;
    illuminating the 1-D nanomaterials sample by a first incident light and a second incident light to cause resonance Rayleigh scattering, wherein the first incident light and the second incident light are not parallel to each other, wherein both the first incident light and the second incident light have a continuous spectrum; and
    acquiring a resonance Rayleigh scattering image of the illuminated 1-D nanomaterials sample using a microscope.

2. The method of claim 1, wherein the 1-D nanomaterials sample comprises nanomaterials selected from the group consisting of carbon nanotubes, graphene strips, metal nanowires, and carbon fibers.

3. The method of claim 2, wherein the 1-D nanomaterials sample comprises single-walled carbon nanotubes.

4. The method of claim 1, wherein the 1-D nanomaterials sample is aligned in different directions.

5. The method of claim 1, wherein both the first incident light and the second incident light are white lights.

6. The method of claim 1, wherein an angle between the first incident light and the second incident light is θ, and 60°<θ<120°.

7. The method of claim 6, wherein θ=90°.

8. The method of claim 1, wherein the 1-D nanomaterials sample is illuminated by the first incident light and the second incident light by further comprises:
    passing the first incident light and/or the second incident light through an optical fiber to reach the 1-D nanomaterials sample.

9. The method of claim 1, wherein illuminating the 1-D nanomaterials sample by the first incident light and the second incident light further comprises:
    passing the first incident light and/or the second incident light through a prism before reaching the 1-D nanomaterials sample; the prism comprises a first prism surface, a second prism surface, and a third prism surface, the 1-D nanomaterials sample is located on the third prism surface, the first incident light illuminates the 1-D nanomaterials sample using the first prism surface, and the second incident light illuminates the 1-D nanomaterials sample using the second prism surface.

10. The method of claim 1, wherein illuminating the 1-D nanomaterials sample by the first incident light and the second incident light further comprises:
    passing the first incident light and/or the second incident light through a liquid container to reach the 1-D nanomaterials sample; the liquid container comprises a side surface and a bottom surface forming a chamber for containing the 1-D nanomaterials sample and the liquid, the side surface comprises at least one transparent portion, the first incident light and/or the second incident light illuminate the 1-D nanomaterials sample using the at least one transparent portion.

11. The method of claim 1, further comprising:
measuring a resonance Rayleigh scattering spectrum of the 1-D nanomaterials sample to determine a chirality of the 1-D nanomaterials sample.

12. The method of claim 1, further comprising:
applying a vapor to the 1-D nanomaterials sample;
obtaining an image of the 1-D nanomaterials sample using optical microscopy;
acquiring an extension direction information of the 1-D nanomaterials sample using the image; and:
when the extension direction of the 1-D nanomaterials sample is parallel to the first incident light, only the first incident light is used to illuminate the 1-D nanomaterials sample; and
when the extension direction of the 1-D nanomaterials sample is not parallel to the first incident light, using both the first incident light and the second incident light to illuminate the 1-D nanomaterials sample.

13. The method of claim 1, wherein the first incident light and the second incident light are filtered and focused before reaching the 1-D nanomaterials sample.

14. A method for imaging one-dimensional (1-D) nanomaterials, comprising:
providing a 1-D nanomaterials sample;
applying vapor to the 1-D nanomaterials sample;
obtaining an image of the 1-D nanomaterials sample using optical microscopy, and
acquiring extension direction information of the 1-D nanomaterials sample using the image;
immersing the 1-D nanomaterials sample in a liquid;
when the 1-D nanomaterials sample extends in a single direction, illuminating the 1-D nanomaterials sample by only a first incident light;
when the 1-D nanomaterials sample extends along more than one direction, illuminating the 1-D nanomaterials sample by a first incident light and a second incident light, wherein the first incident light and the second incident light are not parallel to each other; and
acquiring a resonance Rayleigh scattering image of the 1-D nanomaterials sample with a microscope.

* * * * *